Oct. 28, 1952     H. A. QUIST     2,615,340

LIQUID SAMPLER

Filed May 3, 1951

INVENTOR.
HAROLD A. QUIST

BY

ATTORNEYS

Patented Oct. 28, 1952

2,615,340

UNITED STATES PATENT OFFICE 2,615,340

LIQUID SAMPLER

Harold A. Quist, Elkton, Md., assignor to Sun Oil Company, Philadelphia, Pa., a corporation of New Jersey Application May 3, 1951, Serial No. 224,364

8 Claims. (Cl. 73—425.4)

This invention relates generally to liquid samplers and more particularly to those devices supporting a thermometer and adapted to be lowered into a body of liquid for sampling and testing selected strata of the liquid.

Devices of this type are used in the oil and chemical industries as means for determining the temperature and other characteristics of liquids stored in bulk. It is common practice to submerge a receptacle with which more or less complicated valve mechanisms cooperate to obtain either a "simple" sample, as at one predetermined level, or a "composite" sample which is one taken from a selected level in the liquid upward to the surface including some liquid from all intervening strata.

The earliest form of devices used for this purpose comprised a simple receptacle, like a bottle, from which a stopper could be removed after the device had been submerged to the desired level in the liquid. If the receptacle were held at the selected level until filled with liquid, a simple sample was obtained. If the device were moved slowly upward after the stopper had been removed, it was considered that a composite sample was obtained because the entering liquid was taken from different elevations within the body of the fluid. It will be readily understood that, due to the air contained within the receptacle which must be displaced through the liquid inlet opening in these early devices, the rapidity with which the initial liquid sample entered the container, and the variations in pressure as the receptacle was moved upward through the liquid, the results were seldom, if ever, those desired. It is an object of this invention to provide a sampling device which permits the entrance of liquid into the sampling receptacle unobstructed by entrapped air, yet secures either simple or composite samples as desired.

Subsequent to the earliest stoppered bottles used to take these samples, various forms of cups and valve arrangements have been used progressing in complexity from a simple cup or dipper through complicated valve operated mechanisms involving spring and weight motors. The more complex motor operated samplers so churned the body of the liquid in the sampling process that it was not definitely certain that the sample was representative of the strata measured. Further, the more complex the device, the greater the care and time required to clean it between each successive reading. It is, therefore, another object of this invention to provide a sampling device which is simple in structure, accurate, easy to clean, and is operated with a minimum of effort and preparation.

The present device comprises an elongate receptacle in which a thermometer may be placed. The receptacle is apertured at the top and bottom for the entrance of liquid and evacuation of air. The top and bottom apertures are controlled by valves which are opened by the action of the person taking the sample. The aperture opening mechanism includes a pair of vanes, pivoted to the receptacle, which open the valve by the controlled movement of the device in the body of the liquid being sampled.

The complete structure and the method of operation will be more fully understood by the following detailed description with reference to the drawing in which.

Figure 1:
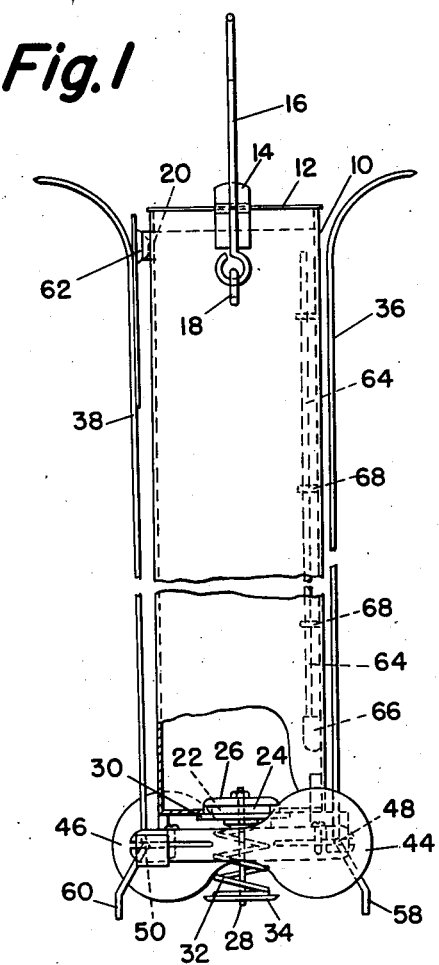
Figure 1 is an elevation view of the sampler.

Referring to the various figures of the drawing wherein like numerals of reference designate similar parts in each of the figures, the numeral 10 designates an elongate receptacle shown as rectangular in cross-section in this the preferred embodiment. A removable top cover 12 is held in place by snap clips 14 to seal the top of the receptacle 10. A handle 16 is fastened to the receptacle 10 by means of eyelets 18 fixed to the sides as shown. An aperture 20 is made in the receptacle 10 near the top but below the engaging edge of the cover 12.

In the bottom of the receptacle 10, there is a second aperture 22, in which a valve seat assembly 24 is supported. A valve member including a valve disk 26, and a stem 28, is arranged to project through the aperture 22 opening upwardly into the body of the receptacle 10. The underside of the aperture 22 is faced with a spider 30 which centers the valve stem 28 and furnishes an abutting face for a compression member such as the spring 32. A washer 34 on the end of the stem 28 holds the spring 32 in position. The spring 32 is a coiled flat-rate spring of sufficient strength to hold the valve seated at maximum sampling depths in the body of the liquid.

A pair of like arcuate vanes 36 and 38 are pivotally mounted on opposite sides of the bottom of receptacle 10 by brackets 40 and 42 respectively positioned in operating relation with the vanes by the rods 48 and 50.

Figure 2:
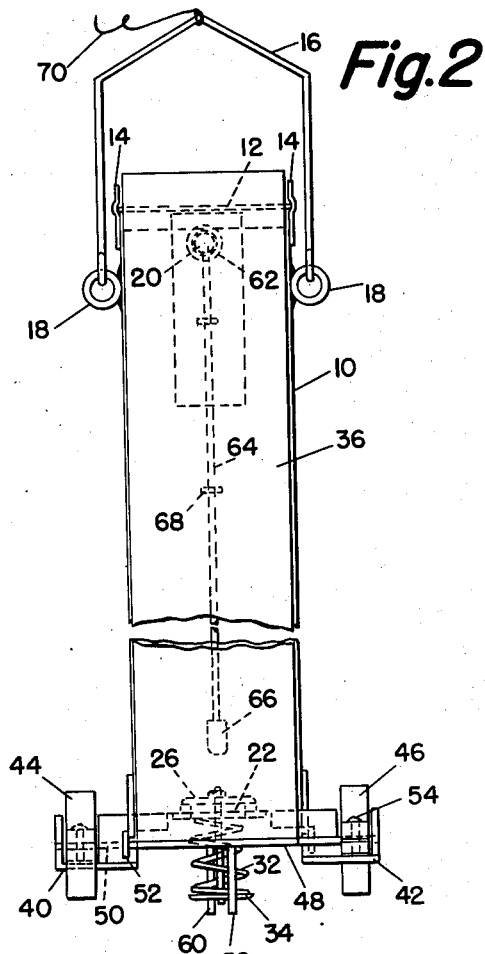
Figure 2 is an elevation view of the sampler taken at 90° to Figure 1.

Each vane is securely fastened to one of the rods which extends across the receptacle to engage one of the weights. In Figure 2, the structure is clear where vane 36 is fastened to rod 48 which is stopped on the left by the head 52 but extends to the full width of the bracket 42 to be supported and firmly engage a counterbalancing weight 46 and to be held in position by the bolt 54. The vane 38 is similarly linked to a counterbalancing weight 44 and supported rotatably in the bracket 40 on the opposite side of the receptacle 10.

Figure 3:
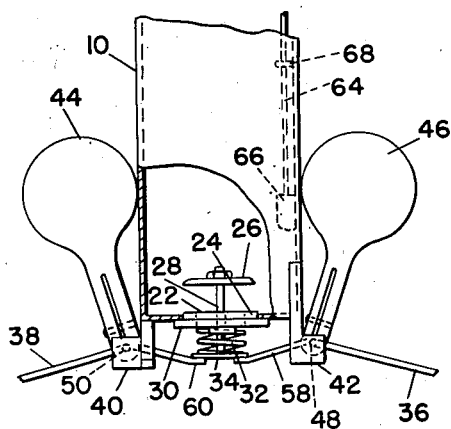
Figure 3 is a fragmentary view similar to Figure 1 showing the details of the valve and vane structure at the bottom of the device.

Valve operating projections 58 and 60 are rigidly secured to vanes 36 and 38 and extend downwardly and outwardly therefrom so as to lie in a vertical plane different from the vanes (see Fig. 1). When the vanes are pivoted to their outward position as shown in Fig. 3, the projections contact the underface of the washer 34 to urge the same upwardly against the compression of spring 32, and hence force the stem 28 and its valve 26 upwardly to open the bottom aperture 22. When the vanes are in the position shown in Fig. 1, the projections 58 and 60 are out of engagement with the washer 34 and the compression spring 32, bearing against the spider 30 and washer 34, maintains the valve 26 in its seated position to close the aperture 22. Vane 38 (see the upper portion of Fig. 1) supports a tapered button closure 62, the latter being positioned to engage in and seal the top aperture 20 when the vane is in its upper position. Thus, it will be seen that both top aperture 20 and bottom aperture 22 are closed when the vanes are in their upper position as shown in Fig. 1 and both apertures are opened when the vanes are pivoted to their lower position as shown in Fig. 3.

In preparing the described sampler for operation, the cover 12 is released from the receptacle 10 by disengaging the clips 14 and inserting the thermometer 64 in the socket 66 and through the retainers 68. The cover 12 is replaced, clipped securely on the receptacle and the button closure 62 is checked to be sure it is in registry and covering the top aperture 20. The sampler is fastened to the suspending line 70 and lowered through the sampling hole of a tank holding the liquid to be sampled.

As the sampler is lowered, the counterbalancing weights 44 and 46 hold the vanes 36 and 38 in the upright position as shown in Figure 1. In this position, the bottom valve member is closed as shown and the button closure 62 is over the top aperture 20. Due to the effect of the weights 44 and 46, and the pressure of the liquid on the arcuate surfaces on the underside of the vanes 36 and 38, the vanes are held erect. This position is maintained until the gauging depth in the liquid body is reached.

When the desired depth is reached, a sharp upward jerk on the suspending line 70 causes the vanes to rotate downwardly, overcoming the effect of the weights 44 and 46 to assume the position indicated by Figure 3. The vane operating projections 58 and 60 engage the washer 34 on the end of the valve stem and urge the valve disk 26 upwardly from the valve seat 24 against the pressure of the spring 32. The upper aperture 20 is uncovered by the downward movement of the vane 38 which carries the button closure 62 with it.

Where a simple sample is to be taken at a fixed depth in the liquid, the vanes having been moved to the open position by the jerking movement, the receptacle is readied to receive the liquid sample by the opening of the lower valved aperture and the air release upper aperture as described. The vanes are held in the open or horizontal position by pulling the device upwardly within the limits of the sampled strata thus preventing the vanes from assuming the vertical position. Due to the pressure differential between the depth of the valved aperture 22 below the top aperture 20, the liquid will flow into the receptacle 10 through the bottom aperture forcing the contained air outwardly through the top aperture. When the receptacle is filled, the air is exhausted, and the weight of the column of liquid in the receptacle assists the spring member 32 to close the valve member when the upward pressure of the vanes is released by no longer pulling the device upward in the liquid. The closure of this bottom valve is assured by permitting the device to sink lower in the liquid being sampled, thus moving the vanes to an upright position and moving the projections 58 and 60 away from the washer to release the valve to its seating position. This return of the vanes to the unoperative position may be accomplished at any time during the sampling operation and thus limit the size of the sample if desired. It is not necessary to permit the device to be completely filled with the liquid. Once the desired sample is obtained and the vanes returned to the inoperative or vertical position by action of the liquid as explained, the upper and lower apertures are closed and the device can be withdrawn from the body of the liquid by a steady upward pull on the suspending line 70. So long as the motion is not jerky, the vanes will not operate by moving to the horizontal position. With the valve closed, there is no washing action as the sampler is pulled upwardly from the liquid. However, where a washing action is desired as part of the sampling operation, an upward and downward movement of the device will cause the apertures to be opened as explained permitting the liquid to pass through.

In the case of procuring a composite sample from the body of liquid above a predetermined depth, it is necessary to open the valve, initially, as indicated above by jerking the device with the suspending line and then move the receptacle upwardly with a more rapid motion than that described for removal to keep the vanes horizontal until the top of the liquid is reached. The size of the sampler receptacle and the depth of the liquid from which the sample is to be started as well as the shape and area of the vanes and size of the weights, determine the speed with which the upward movement is controlled. As will be readily understood, the sample should be fully obtained by the time the sampler has reached the surface of the liquid and before the weight of the column of liquid in the receptacle is heavy enough to assist the closing of the lower valve member down on the seat. The contained air in the receptacle exhausting through the upper or top aperture, it will be understood, will prevent the liquid from entering through the upper aperture in any quantity. A small amount of liquid through that opening would not affect the sample as it is also from the body of the liquid being sampled.

The disclosed sampling device depends for its usefulness on the relationship between the operating area of the vane surfaces, the effectiveness of the counterbalancing weights, and the valve assembly. With these controls properly proportioned, the effectiveness and simplicity of the device is apparent. A model device was constructed and it was found that in general to be effective the compression spring 32 of the bottom valve should exert a pressure greater than the highest pressure encountered in the deepest sampling operation. Thus, the valve will be kept closed until activated positively by the vane structure. Also, the spring will assist in closing the valve when the receptacle is filled or slight movement is made to relieve the valve of the vane pressure.

The vane area and weight sizes are also controlled by the depth of operation, but due to practical limitations, it is not feasible to change these elements for each gauging operation. To operate most efficiently, the vanes should be small for great depths and large for shallow sampling, and the counter weights should be fashioned and levered in accordance with the vanes. A constructed model shows that a practical relation of these elements is mathematically possible and gives accurate gauging results. It was found for gauging varied depths up to a maximum of 48 feet—a vane size of 10 sq. inches, weights of 1 inch pound moment, and a flat rate compression spring rated at 20 pounds per sq. inch, operated very efficiently.

The structure described here as a specific embodiment may be modified in many details and still be within the spirit of the invention. For example, the valve and actuating means extending from the counterbalanced vane is a very simple structure for performing this operation. Many ways of opening the lower aperture by movement of the vanes can readily be devised. Further, although a receptacle rectangular in cross-section is preferred in the exemplary embodiment, any other cross-section form will apparently work equally as well. This invention, therefore, is not to be restricted except in so far as is necessitated by the prior art and by the spirit of the appended claims.

I claim:

1. A device for selectively sampling liquid bodies comprising a closed receptacle having apertures therein adjacent the top and bottom thereof, vanes pivotally mounted on opposite sides of said receptacle, and closure means for said apertures adapted to respond to the movement of said vanes.

2. A device for selectively sampling liquid bodies comprising an elongate closed receptacle having an upper aperture adjacent the top thereof and a bottom aperture therein, vanes pivotally attached to opposite sides of said receptacle at the bottom thereof, a valve in said bottom aperture, and means for controlling the apertures for the admission of liquid to said receptacle responsive to the movement of said vanes.

3. A device for selectively sampling liquid bodies comprising a closed receptacle having apertures therein adjacent the top and bottom thereof, a pair of vanes pivotally attached adjacent the bottom of the receptacle and on opposite sides thereof, a valve positioned to operably control the bottom aperture, and means connected to the vanes to operate said valve and uncover the top aperture for obtaining samples when immersed in liquid.

4. A device for selectively sampling liquid bodies comprising an elongate closed receptacle having apertures therein adjacent the top and bottom thereof, a pair of vanes pivotally mounted on opposite sides of and adjacent the bottom of said receptacle, means fastened to the vanes for counterbalancing the same, a valve operably mounted in the bottom aperture, and means secured to said vanes for opening the apertures in said receptacle to a sampling operation within a liquid body.

5. A device for selectively sampling liquid bodies comprising a closed receptacle having an upper aperture adjacent the top and a lower aperture adjacent the bottom thereof, a pair of vanes pivotally mounted on opposite sides of and adjacent the bottom of said receptacle, means fastened to the vanes for counterbalancing the same, a valve operably mounted in operable relation to the lower aperture, and means connected to the vanes to control the apertures for the flow of liquid into said receptacle.

6. A device for selectively sampling liquid bodies comprising an elongate closed receptacle having apertures therein adjacent the top and bottom thereof, a pair of vanes pivotally mounted on opposite sides of and adjacent the bottom of said receptacle, balancing weights fastened to the vanes at the pivotal connection, a spring retained valve operably mounted in the bottom aperture, and projections extending from said vanes arranged to control the apertures in sampling operation in response to the movement of said vanes.

7. A device for selectively sampling liquid bodies comprising an elongate closed receptacle having apertures therein adjacent the top and bottom thereof, arcuate vanes pivotally mounted on opposite sides of said receptacle, counterbalancing means in operating engagement with said vanes to keep them normally upright and close to the receptacle sides, a closure mounted on one of said vanes in registry with the top aperture, a spring operated valve adapted to extend through the bottom aperture and in closing relation therewith, and connecting means between the vanes and said valve to transmit the movement of the vanes thereto.

8. A device for selectively sampling liquid bodies comprising an elongate closed receptacle having an upper and lower aperture therein, arcuate vanes pivotally mounted on opposite sides of said receptacle adjacent the bottom thereof, counterbalancing weights arranged in operating engagement with the vanes to keep them normally upright along the receptacle sides, a closure, mounted on one of said vanes in registry with said upper aperture, a spring operated valve adapted to extend through the bottom aperture in closing relation therewith, and projections extending from said vanes below the pivots thereof and arranged to engage the spring closed valve when said vanes pivot away from the vertical position.

HAROLD A. QUIST.

REFERENCES CITED

The following references are of record in the file of this patent:

UNITED STATES PATENTS

| Number | Name | Date |
|---|---|---|
| 1,839,681 | Johnson | Jan. 5, 1932 |
| 2,515,882 | McClusky | July 18, 1950 |